(12) United States Patent
Jackson et al.

(10) Patent No.: US 8,100,368 B2
(45) Date of Patent: Jan. 24, 2012

(54) CLAMP AND SEISMIC SWAY BRACE

(75) Inventors: Jeffrey K. Jackson, Sagamore Hills, OH (US); Eric J. Wilson, Solon, OH (US); Paul A. Hart, Warren, OH (US)

(73) Assignee: ERICO International Corporation, Solon, OH (US)

( * ) Notice: Subject to any disclaimer, the term of this patent is extended or adjusted under 35 U.S.C. 154(b) by 782 days.

(21) Appl. No.: 12/136,951

(22) Filed: Jun. 11, 2008

(65) Prior Publication Data

US 2008/0251651 A1    Oct. 16, 2008

Related U.S. Application Data

(63) Continuation-in-part of application No. 11/636,134, filed on Dec. 8, 2006, now abandoned.

(60) Provisional application No. 60/749,197, filed on Dec. 9, 2005, provisional application No. 60/943,105, filed on Jun. 11, 2007.

(51) Int. Cl.
*F16L 3/00* (2006.01)

(52) U.S. Cl. .................... 248/62; 248/74.1; 248/317

(58) Field of Classification Search .................... 248/59, 248/62, 65, 68.1, 74.1, 63, 317; 403/408.1, 403/150, 151, 395, 387, 71, 385; 52/167.1, 52/167.3, 152, 713, 282.5, 741.3; 411/539, 411/432, 433, 511, 517, 518
See application file for complete search history.

(56) References Cited

U.S. PATENT DOCUMENTS

| | | | |
|---|---|---|---|
| 1,646,639 A | | 10/1927 | Crowell |
| 1,710,060 A | | 4/1929 | Metcalf, Jr. |
| 2,173,037 A | | 9/1939 | Dailey |
| 3,385,545 A | | 5/1968 | Patton |
| 4,065,218 A | * | 12/1977 | Biggane ........................... 403/71 |
| 4,078,752 A | * | 3/1978 | Kindorf ........................... 248/62 |
| 4,697,770 A | | 10/1987 | Kirschner |
| 4,765,106 A | | 8/1988 | Modrovich |
| 4,799,444 A | * | 1/1989 | Lisowski .................. 114/221 R |
| 4,901,958 A | * | 2/1990 | Kelso .............................. 248/59 |
| 4,915,305 A | | 4/1990 | O'Brien et al. |

(Continued)

FOREIGN PATENT DOCUMENTS

DE          19509997          9/1996

(Continued)

OTHER PUBLICATIONS

International Search Report and Written Opinion from corresponding International Application No. PCT/US08/66511.

*Primary Examiner* — Tan Le

(74) *Attorney, Agent, or Firm* — Renner, Otto, Boisselle & Sklar, LLP

(57) ABSTRACT

A seismic sway brace includes a clamp for engaging a circular object, a sway brace member, and a pair of connecting mechanisms for coupling the circular object to the sway brace member, and for coupling the sway brace member to building structure. The sway brace member may be a sway brace pipe or rod. Each of the connecting mechanisms may include a pair of strap clamps, held together by a retainer. The strap clamps and/or the circular object clamp may include one or more longitudinal slots. The longitudinal slots enhance wrapping of the clamps that engage the sway brace member or circular object, allowing the clamps to better engage the sway brace member or circular object.

19 Claims, 10 Drawing Sheets

U.S. PATENT DOCUMENTS

| | | | |
|---|---|---|---|
| 5,188,317 A * | 2/1993 | Roth | 248/59 |
| 5,413,063 A * | 5/1995 | King | 114/221 R |
| 5,727,762 A | 3/1998 | Cosentino | |
| 5,769,112 A | 6/1998 | Rendina | |
| 6,273,372 B1 | 8/2001 | Heath | |
| 6,508,441 B1 | 1/2003 | Kirschner | |
| D489,000 S | 4/2004 | Ellery | |
| 6,837,009 B1 * | 1/2005 | Roth | 52/167.1 |
| 6,896,226 B2 * | 5/2005 | Heath | 248/62 |
| 7,010,889 B1 | 3/2006 | Renfro | |
| 7,140,579 B2 | 11/2006 | Kirschner | |
| 7,654,043 B2 * | 2/2010 | Heath | 52/167.3 |
| 2005/0230569 A1 | 10/2005 | Kirschner | |
| 2007/0131823 A1 | 6/2007 | Mominee et al. | |

FOREIGN PATENT DOCUMENTS

| | | |
|---|---|---|
| DE | 29801437 | 3/1998 |
| DE | 202004016038 | 1/2005 |
| EP | 0123363 | 10/1984 |
| EP | 0760445 | 3/1997 |
| EP | 1384928 | 1/2004 |
| EP | 1741965 | 1/2007 |
| SE | 454079 | 3/1988 |

* cited by examiner

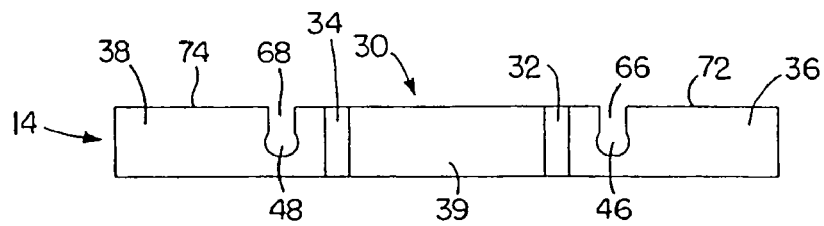
FIG. 4
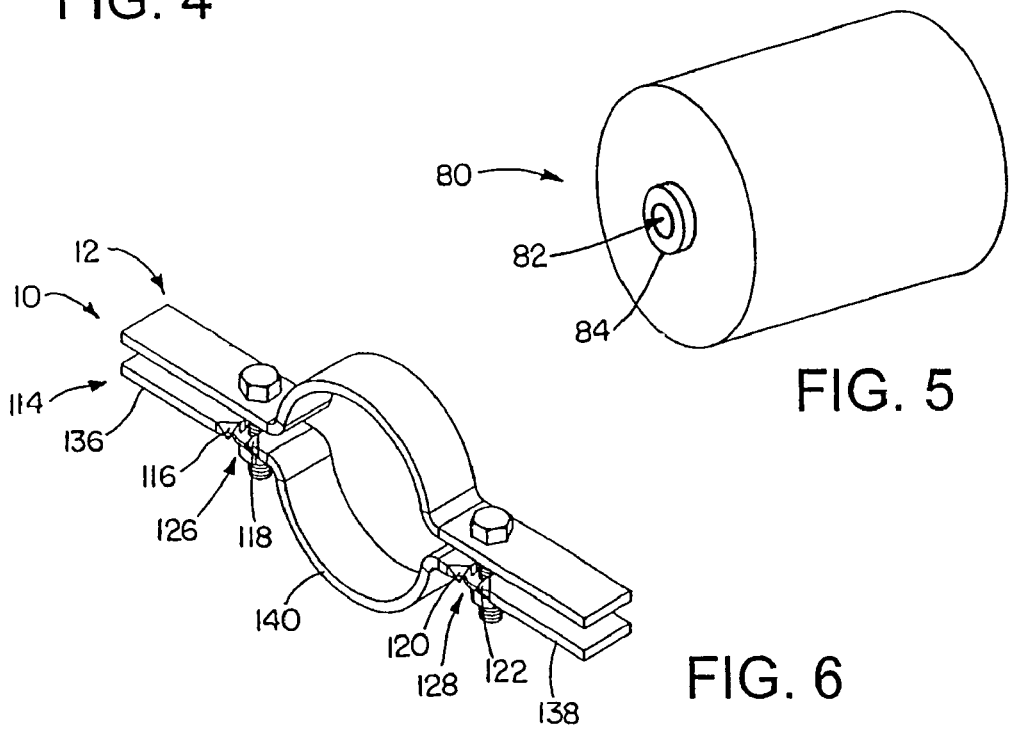
FIG. 5
FIG. 6
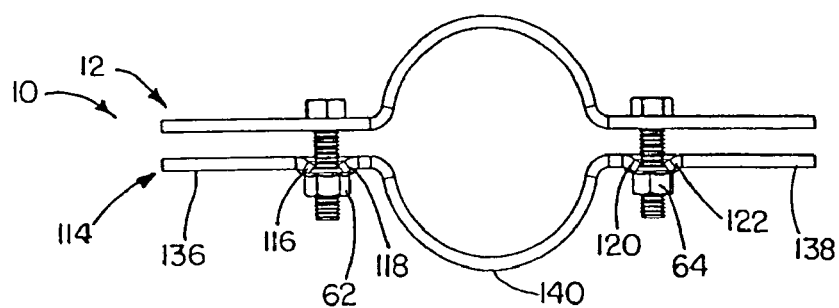
FIG. 7
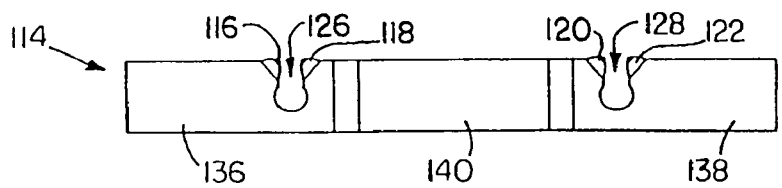
FIG. 8

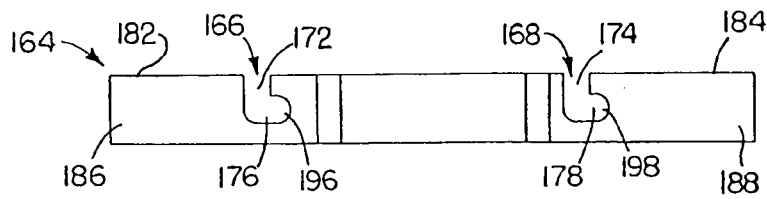
FIG. 9
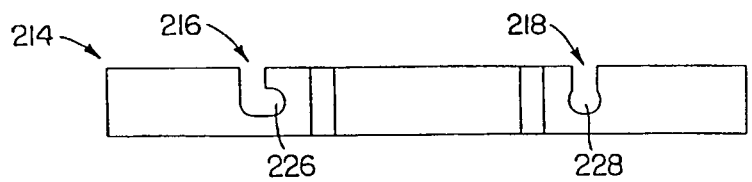
FIG. 10
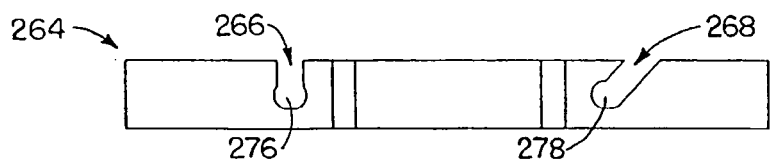
FIG. 11
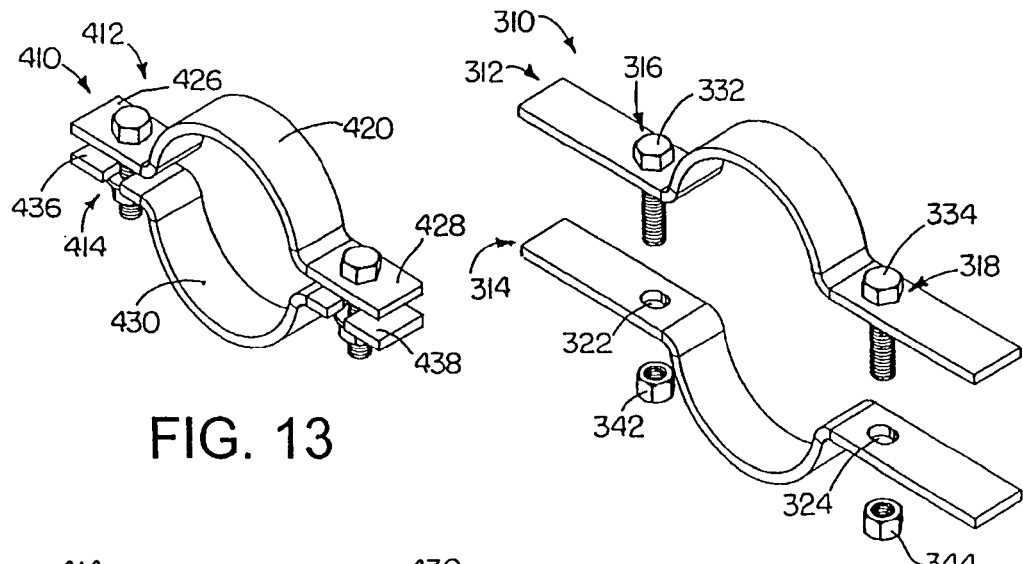
FIG. 13
FIG. 12
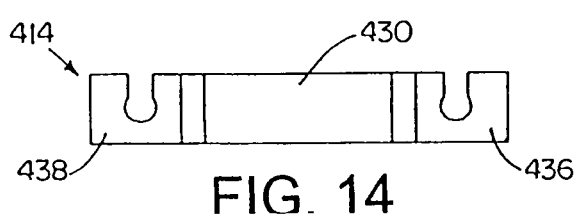
FIG. 14

CLAMP AND SEISMIC SWAY BRACE

This application is a continuation-in-part of U.S. application Ser. No. 11/636,134, filed Dec. 8, 2006, now abandoned which claims priority under 35 USC 119 to U.S. Provisional Application No. 60/749,197, filed Dec. 9, 2005; this application also claims priority under 35 USC 119 to U.S. Provisional Application No. 60/943,105, filed Jun. 11, 2007. All of the preceding applications are incorporated herein by reference in their entireties.

BACKGROUND OF THE INVENTION

1. Technical Field of the Invention

This invention relates generally as indicated to clamps for circular objects, and to such clamps are parts of seismic sway braces.

2. Description of the Related Art

Clamps for holding circular objects such as pipes or conduit are commonly used in a wide variety of circumstances, such as to secure the objects to structure, to secure other objects or fixtures to the circular objects, or to otherwise limit movement of the circular objects.

One example of a clamp used for holding circular objects is a riser clamp, used to secure vertical pipe runs, such as in a plumbing stack. A stack is a vertical run of pipe through a building, used for example to vent plumbing drain lines. The vertical run may be several stories high, passing through circular floor openings that are greater in diameter than the diameter of the pipe run.

These vertical runs of pipe are secured by riser clamps. An example prior art riser clamp 1 is shown in FIG. 1. The riser clamp 1 has a pair of bar portions 2 of rectangular cross-section bar each having a pair of straight ends 3 with a circular portion 4 between the straight ends 3. The bar portions 2 are clamped onto a pipe or conduit 5, with opposite sides of the pipe 5 engaged by surfaces of the circular portions 4. The bar portions 2 are secured onto the pipe 5 by a pair of bolts 6 that pass through holes 7 in the straight ends 3 on either side of the circular portions 4, and nuts 8 that threadedly engage the bolts 6. The nuts 8 are tightened to clamp the pipe 5 securely between the circular portions 4. The circular portions 4 are configured so that the straight ends 3 of the portions 2 do not come into contact when the riser clamp 1 is installed, but rather there is a spacing between the straight ends 3 of one of the bar portions and the corresponding straight ends 3 of the other bar portion.

A riser clamp such as the riser claim 1 is secured to a vertical run of piping just above a circular floor opening though which the pipe run passes. The riser clamp 1 ordinarily rests on the floor, with the straight ends 3 being long enough to extend beyond the circular floor opening. Thus one function of the riser clamp 1 is to prevent vertical movement of the pipe, since the riser clamp 1 is too large to fit through the circular floor opening.

In addition, the riser clamp 1 prevents torquing or tilting of the pipe run. The spacing between the corresponding straight ends 3 of the portions 2 provides a stable base that resists twisting or torquing of the pipe that would otherwise result in tipping of the clamp 1 over an edge of the straight ends 3 of one of the portions 2. In other words, having the corresponding straight ends 3 of the portions 2 separated from each other provides a base that engages the floor around the circular floor opening to prevent undesirable twisting, tilting, and/or torquing of the pipe run.

Nonetheless, there is room for improvement in that the riser clamp 1 involves a large number (six) of separate parts, and two different threading operations. In addition, some care must be taken to provide at least rough symmetry between the tightening of the nuts 7 on opposite sides of the pipe 5, to have proper installation of the riser clamp 1.

From the foregoing it will be appreciated that improvements would be desirable for pipe or conduit clamps in general, and for riser clamps in particular.

One motivation for securing objects such as pipes is to prevent damage during seismic events such as earthquakes. Seismic sway bracing is often required for plumbing systems, fire sprinklers, electrical systems, heating conduits, ventilation conduits, air conditioning conduits, and other structural and non-structural components of a building as well as some equipment installed in buildings. Previously installation of pipe clamps and seismic sway bracing involved disassembling the service pipe clamp and then the reassembling around the service pipe. This is time consuming and also provides the opportunity to lose nuts and bolts in the installation process. Frequently installation is high in the air working near a ceiling so the dropping of nuts and bolts during installation wastes significant time which costs more money during installation. From this it will be appreciated that improvements would be desirable in bracing for pipes and conduits.

SUMMARY OF THE INVENTION

According to an aspect of the invention, a clamp has one or more longitudinal slots in a section that engages a circular object.

According to another aspect of the invention, a seismic sway brace includes a two-part clamp for engaging a circular object to be braced, a sway brace member, and a pair of connecting members, for connecting the circular object to the sway brace member, and for connecting the sway brace member to a bracket attached to building structure. The connecting members may include strap clamps held together by a retainer member.

According to yet another aspect of the invention, a method of seismic sway bracing includes: placing a clamp around a circular object to be braced; and using additional clamps to secure the clamp around the circular object to a sway bracing member.

According to still another aspect of the invention, a seismic sway brace includes: a circular object clamp; a sway brace member; and additional clamps for coupling the sway brace member to the circular object clamp, and for coupling the sway brace member to building structure.

According to yet another aspect of the invention, a clamp has an object-engaging section with at least one longitudinal slot therein.

According to an aspect of the invention, a clamp includes a pair of clamp parts, at least one of which has open slots therein for receiving bolts in holes of the other piece.

According to an aspect of the invention, a clamp includes a pair of clamp parts, one of which has open slots therein for receiving bolts in holes of the other piece.

According to another aspect of the invention, a clamp has bolts permanently fixed in holes in one its parts, with the bolts permanently unable to rotate relative to the part.

According to yet another aspect of the invention, a clamp includes: a first bar portion having a first curved central section, and a pair of first extensions extending from opposite ends of the first curved central section; a second bar portion having a second curved central section, and a pair of second extensions extending from opposite ends of the first curved central section; and a pair of fasteners joining the bar portions together. The first bar portion has a pair of holes in respective of the first extensions. The second bar portion has a pair of holes in respective of the second extensions. At least one of the holes in the second extensions is an open hole.

According to still another aspect of the invention, a method of installing a clamp around an object to be clamped, includes the steps of: placing respective central curved sections of first and second bar portions on opposite sides of the object to be clamped, wherein the curved sections of the bar portions are between respective pairs of extensions connected to opposite sides of the curved section; and coupling the bar portions together, with the object to be clamped between the central curved sections, wherein the coupling includes passing a shaft of a fastener that is coupled to one of the extensions of the first bar portion, through a slot and into an open hole in one of the extensions in the second bar portion.

According to a further aspect of the invention, a clamp bar portion includes: a central curved section; a pair of extensions connected to opposite ends of the central curved section; and a pair of bolts passing through holes in respective of the extensions; wherein the bolts are fixedly attached to the extensions.

According to a still further aspect of the invention, a clamp includes: a first bar portion having a first curved central section, and a pair of first extensions extending from opposite ends of the first curved central section; a second bar portion having a second curved central section, and a pair of second extensions extending from opposite ends of the first curved central section; and a pair of bolts joining the bar portions together. The first bar portion has a pair of holes in respective of the first extensions. The second bar portion has a pair of holes in respective of the second extensions. At least one of the holes in the second extensions includes means for receiving a bolt shaft of one of the bolts while the bolt shaft is between a bolt head and a nut threaded on the bolt shaft.

According to another aspect of the invention, a method of seismic bracing includes the steps of: placing a clamp around a circular object to be braced; and using one or more additional clamps to secure the clamp around the circular object to a sway bracing member.

According to yet another aspect of the invention, a seismic sway brace includes: a circular object clamp; a sway brace member; and additional clamps for coupling the sway brace member to the circular object clamp, and for coupling the sway brace member to building structure.

According to still another aspect of the invention, a clamp having an object-engaging section with a longitudinal slot therein.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale:

FIG. 4 is a side view of the second bar portion of the clamp of FIG. 2;

FIG. 5 is an oblique view of a stake that may be used in attaching bolts to the first bar portion of the clamp of FIG. 2;

FIG. 6 is an oblique view of an alternate configuration clamp in accordance with the present invention;

FIG. 7 is an end view of the clamp of FIG. 6;

FIG. 8 is a side view of the second bar portion of the clamp of FIG. 6;

FIG. 9 is a side view of an alternate embodiment second bar portion usable as part of a clamp of the present invention, having a pair of L-shape slots;

FIG. 10 is a side view of another alternate embodiment second bar portion usable as part of a clamp of the present invention, having one L-shape slot and one vertical slot;

FIG. 11 is a side view of yet another alternate embodiment second bar portion usable as part of a clamp of the present invention, having one diagonal slot and one vertical slot;

FIG. 12 is an exploded view of an alternate embodiment clamp in accordance with the present invention;

FIG. 13 is an oblique view of another alternate embodiment clamp in accordance with the present invention;

FIG. 14 is a side view of the second bar portion of the clamp of claim 13;

DETAILED DESCRIPTION

A seismic sway brace includes a clamp for engaging a circular object, a sway brace member, and a pair of connecting mechanisms for coupling the circular object to the sway brace member, and for coupling the sway brace member to building structure. The sway brace member may be a sway brace pipe or rod. Each of the connecting mechanisms may include a pair of strap clamps, held together by a retainer. The strap clamps and/or the circular object clamp may include one or more longitudinal slots. The longitudinal slots enhance wrapping of the clamps that engage the sway brace member or circular object, allowing the clamps to better engage the sway brace member or circular object.

A clamp includes first and second parts, each of the parts having a circular central section and a pair of straight extensions extending away from the circular central section in opposite directions. Both of the parts have holes in the straight extensions, on opposite sides of the circular central section. In the first part the holes are closed holes, while in the second part the holes are open holes, connected by slots to an upper edge of the part. Bolts may be pre-placed through the closed holes, with nuts threaded onto the bolts, but not tightened. The pre-placed bolts may be received through the slots and into the open holes of the second part. The nuts may then be tightened against the second part to clamp the circular central sections on opposite sides of a circular object, such as a vertical pipe run, between the parts. The use of open holes and pre-placed bolts facilitates installation of the riser clamp, by reducing the number of parts and installation steps involved in the process. The slots for the open holes may have any of a variety of suitable shapes, including straight vertical, straight diagonal, and an L-shape. Both of the slots in the second part may have the same shape, or the slots may have different shapes.

According to a variant, the bolts are permanently secured to the first part so as to prevent rotation of the bolts. This further simplifies installation, in that there is no need to grip the bolt with a wrench or other tool when the nut is tightened against the second part. The permanently secured bolts may be used in conjunction with a part having open holes. Alternatively, a part having permanently secured bolts may be used in conjunction with a second part having closed holes, with the bolts passed into the closed holes before the nuts are threaded on the bolts.

Figure 2:
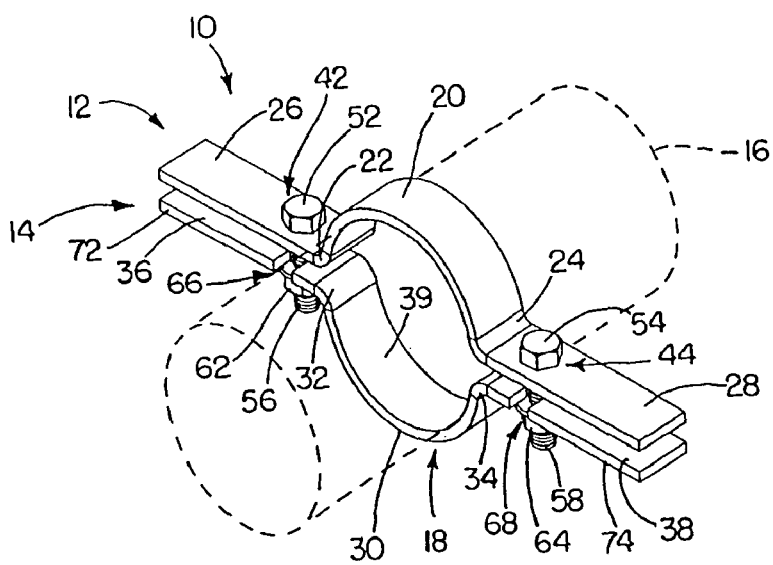
FIG. 2 is an oblique view of a riser clamp in accordance with the present invention.
Figure 3:
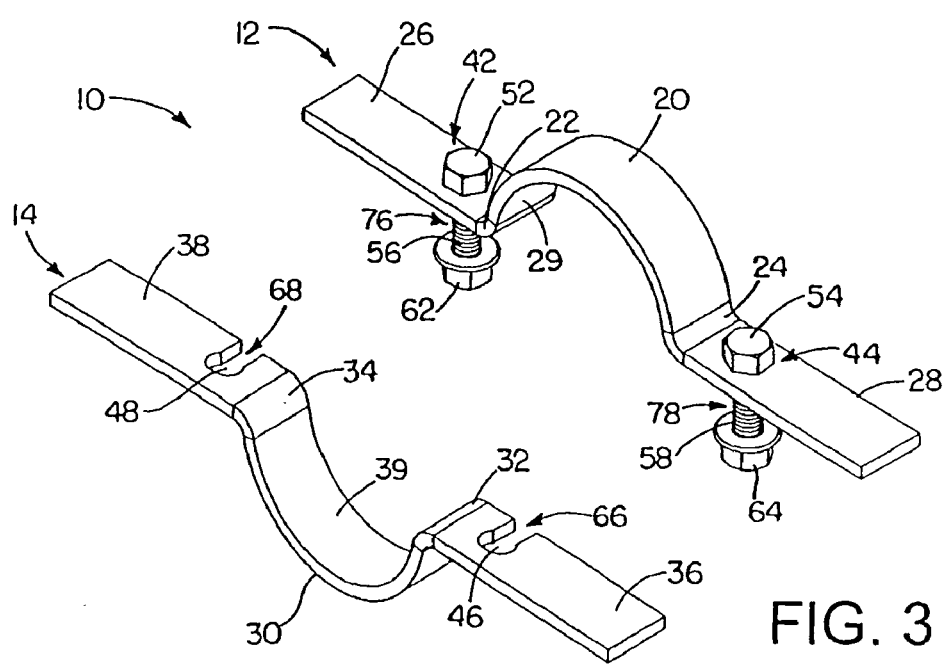
FIG. 3 is an exploded view of the riser clamp of FIG. 2.

Referring to FIGS. 2 and 3, a clamp 10 includes a pair of bar portions 12 and 14 for securing therebetween a circular object 16, such as a pipe or conduit, in a round space 18 between the bar portions 12 and 14. The first bar portion 12 includes a central circular section 20 having radiused bends 22 and 24, curved in opposite direction from the circular section 20. More broadly, the central section 20 is a curved section. The radiused bends 22 and 24 bend back to straight extensions 26 and 28 extending away from the circular section 20. The circular section 20 has an inner surface 29 configured to contact the object 16 when the clamp 10 is installed. The extensions 26 and 28 may be substantially in line with one another, and may be configured to extend outward away from the circular object 16 in opposite, radial and diametrically opposed, directions. With this configuration, the circular section 20 may be substantially a semi-circle. Alternatively, the extensions 26 and 28 may have other configurations, such as being angled at a nonzero angle relative to one another.

The second bar portion 14 has similar parts to those of the first bar portion 12: a central circular (or curved) section 30, a pair of radiused bends 32 and 34 emanating from opposite sides of the central circular section 30, bending back to respective straight extensions 36 and 38 extending away from the circular section 20. The central circular section has an inner surface 39 for engaging a portion of the circular object 16. The circular section inner surfaces 29 and 39 together define the round object-receiving space 18 between the bar portions 12 and 14.

The extensions 26 and 28 are each longer than the distance between the curves 22 and 24, and the extensions 36 and 38 are each longer than the distance between the curves 32 and 34. More broadly, the extensions 26 and 28 may each be at least half as long as the distance between the curves 22 and 24, and the extensions 36 and 38 may each be at least half as long as the distance between the curves 32 and 34. The extensions are 26, 28, 36, and 38 are each planar, substantially flat and straight, with no protrusions extending therefrom perpendicular to the planes of the extensions 26, 28, 36, and 38.

The first bar portion 12 has closed holes 42 and 44 in the respective extensions 26 and 28. The second bar portion 14 has open holes 46 and 48 in the respective extensions 36 and 38. The holes 42, 44, 46, and 48 are used for receiving a pair of bolts 52 and 54, to secure the bar portions 12 and 14 together around the circular object 16. Respective shafts 56 and 58 of the bolts 52 and 54 pass through pairs of the holes 42/46 and 44/48. Nuts 62 and 64 are threaded onto the shafts 56 and 58. The nuts 62 and 64 may be tightened to pull the bar portions 12 and 14 together, clamping the bar portions 12 and 14 against the clamped object 16.

The terms "bolt" and "nut," as used herein, broadly refer to threadedly engagable fasteners. The term "bolt" encompasses such externally threaded fasteners as certain types of screws. The term "nut" encompasses a wide variety of internally threaded parts, such as hex nuts, square nuts, and wing nuts, to give but a few examples. The term "fastener" is used even more broadly, to include non-threaded engaging parts in addition to threaded parts.

The holes 42 and 44 are closed holes in that they are fully surrounded by the material of the first bar portion 12. The term "closed hole" is used herein to refer to a hole that is sufficiently surrounded by material of a bar portion that a bolt only may be inserted into the hole by substantially longitudinally moving the shaft of the bolt into the hole. As illustrated the closed holes 42 and 44 may have an elongate shape that allows some positioning of the bolt shafts 56 and 58 within the closed holes 42 and 44. Alternatively, the closed holes 42 and 44 may have a different suitable shape, such as a circular shape.

With reference now in addition to FIG. 4, the holes 46 and 48 are open holes that are in communication with respective slots 66 and 68 that provide openings to reach the holes through open portions along top edges 72 and 74 of the extensions 36 and 38. The term "open hole" is used herein to refer to a hole that has an open side of sufficient width to allow a bolt shaft to be inserted through the open side into the hole. The open holes 46 and 48 may be generally circular, or may have an elongate shape. The slots 66 and 68 may have a width that is less than that of the open holes 46 and 48 where the slots 66 and 68 link up with the open holes 46 and 48. Alternatively the slots 66 and 68 may have a width that is the same as or greater than that of the open holes 46 and 48.

The open holes 46 and 48 allow the coupling together of the bar portions 12 and 14 without the need for inserting the bolt shafts 56 and 58 through the holes 42/46 and 44/48 while the bar portions 12 and 14 are around the circular object 16. The bolts 52 and 54 may be pre-placed in the first bar portion 12 before the installation process of clamping the bar portions 12 and 14 around the circular object 16. The bolt shafts 56 and 58 may be inserted into the closed holes 42 and 44, with the nuts 62 and 64 threaded onto the bolt shafts 56 and 58. The nuts 62 and 64 are not tightened at this time. Instead, gaps 76 and 78 are left along the bolt shafts 56 and 58, between the first bar portion 12 and the nuts 62 and 64. These gaps 76 and 78 are left so that these open portions of the bolt shafts 56 and 58 may later be inserted into the slots 66 and 68, and from there into the open holes 46 and 48. The clamp 10 may be shipped with the bolts 52 and 54 pre-placed in the first bar portion 12, and with the nuts 62 and 64 threaded onto the bolt shafts 56 and 58.

In the installation process, first the first bar portion 12 is placed against the circular object 16 to be clamped. The circular section inner surface 29 may be placed in contact with the outer the circular object 16.

Then the second bar portion 14 is brought into engagement with the first bar portion 12. The second bar portion 14 is placed on the opposite side of the circular object 16 from the first bar portion 12. The second bar portion 14 may be placed on the circular object 16 below the level of the first bar portion 12, with the top edges 72 and 74 and the open ends of the slots 66 and 68 facing upward. One or both of the bar portions 12 and 14 are then moved to bring the bolt shafts 56 and 58 through the slots 66 and 68 and into the open holes 46 and 48. This may be accomplished by a simple relative vertical movement of the bar portions 12 and 14. Alternatively depending on the shape and/or configuration of the slots 66 and 68, rotation and/or turning of the bar portions 12 and 14 may be performed to bring the bolts 52 and 54 into engagement with the open holes 46 and 48. The bolt shafts 56 and 58 may engage the corresponding slots 66 and 68 substantially simultaneously. Alternatively, one of the bolt shafts 56 and 58 may engage its slot before the other bolt shaft.

After the bolts 52 and 54 are brought into engagement with the open holes 46 and 48, the nuts 62 and 64 are tightened along the bolt shafts 56 and 58. This secures the bar portions 12 and 14 together, with the circular object 16 clamped between them in the round space 18 between the circular sections 20 and 30.

The second bar portion 14 is oriented with the slots 66 and 68 facing upward in order to provide improved load paths for carrying loads on the clamp 10. Alternatively, the second bar portion 14 may be oriented with the slots 66 and 68 facing downward, which may aid in retaining the bolts 52 and 54 engaged with the open holes 46 and 48 during and after installation of the clamp 10.

The bolts 52 and 54 may initially be loose within the closed holes 42 and 44. That is, the bolts 52 and 54 may be able to freely rotate within the closed holes 42 and 44.

Alternatively, the bolts 52 and 54 may be fixedly attached to the first bar portion 12 so that the bolts 52 and 54 are unable to rotate relative to the first bar portion 12. The bolts 52 and 54 may be inserted into the closed holes 42 and 44, and fixed within the holes 42 and 44 relative to the first bar portion 12. The fixing of the bolts 52 and 54 within the holes 42 and 44 may be accomplished by any of a variety of suitable methods.

One method of attaching the bolts 52 and 54 to the first bar portion 12 is to ring stake the bolts 52 and 54 within the closed holes 42 and 44. For ring staking, the closed holes 42 and 44 may have an initial diameter that is slightly larger than the diameter of the bolt shafts 56 and 58. After the bolt shafts 56 and 58 are inserted into the closed holes 42 and 44, a ring staking operation is used to deform material of the first body portion 12 in the vicinity of the holes 42 and 44. Referring now to FIG. 5, a metal stake 80 is used to accomplish the ring staking. The stake 80 is used to couple the bolts 52 and 54 to the first bar portion 12 sequentially, one at a time. The stake 80 has a central hole 82 for receiving the bolt shafts 56 and 58 when the stake 80 is slammed down against the first body portion 12 in the vicinity of the closed holes 42 and 44. The stake 80 has a sharp edge 84 surrounding the central hole 82, at a diameter slightly greater than the diameter of the closed holes 42 and 44. As the stake 80 is brought into contact with the first bar portion 12 with force, the sharp edge 84 presses into and locally deforms the material of the first bar portion 12. Material of the first bar portion 12 that is radially inward of the sharp edge 84 is pressed radially inward. This constricts the closed holes 42 and 44, clamping the bolt shafts 56 and 58 within the constricted holes. Deformed material of the first bar portion 12 may enter into and engage threads on the bolt shafts 56 and 58. The bolt shafts 56 and 58 are permanently fixed in the closed holes 42 and 44, unable to be rotated within or be removed from the closed holes 42 and 44. The bolts 52 and 54 are thus securely attached to the first bar portion 12.

Alternatively, the closed holes 42 and 44 may be internally threaded holes with threads that engage the threads on the bolt shafts 56 and 58. The bolts 52 and 54 may be threaded into the holes 42 and 44. Following that, ring staking may performed with the stake, as described above. Ring staking the bolts 52 and 54 into internally threaded holes may produce a more secure attachment of the bolts 52 and 54 to the first bar portion 12. However, it will be appreciated that internally threading the holes adds another step in the manufacturing process for the first bar portion 12.

Many alternative methods are available for attaching the bolts 52 and 54 to the first body portion 12. End portions of the bolt shafts 56 and 58, closest to the heads of the bolts 52 and 54, may be knurled, with straight or spiral knurls, to engage the inner surfaces of the holes 42 and 44. The knurling may be done in addition to the ring staking. Or the knurling may be done as an alternative to the ring staking, with the knurled parts of the bolt shafts 52 and 54 being press fit into the closed holes 42 and 44. For press fitting, it is advantageous that the bolts 52 and 54 be made of a material that is harder than the material of the first body portion 12, so that the knurled portions dig into and engage the first body portion 12.

As a further alternative the bolt shafts 56 and 58 may have unthreaded portions near their bolt heads. These unthreaded shoulder portions may be securely engaged by the ring staking process described earlier.

Other alternatives include use of weld studs underneath bolt heads of the bolts 52 and 54. The weld studs have projections that would be resistance welded into place, and compressed onto the first bar portion 12. A further alternative using ring staking would be use of square holes in the first bar portion 12 that would receive carriage bolts. The carriage bolts would be secured in the square holes by ring staking.

Attaching the bolts 52 and 54 to the first bar portion 12 advantageous may reduce the number of tools used in the installation of the clamp 10. With the bolts 52 and 54 attached to the first bar portion 12, there is no need to grip the bolts 52 and 54, such as with a wrench or pliers, to prevent rotation of the bolts 52 and 54 while the nuts 62 and 64 are being tightened along the bolt shafts 56 and 58.

The clamp 10 is intended for use as a riser clamp, such as for securing vertical runs of pipes or conduits. Thus riser clamps such as the clamp 10 function to support vertical loads along the axes of such vertical runs of pipes or conduits. One aspect of the clamp 10 in use is that the extensions 26 and 28 of the bar portion 12 do not contact the extensions 36 and 38 of the bar portion 14. Thus the clamping force of the bolts 52 and 54 is transmitted to the pipe or conduit 16 by contact with the circular sections 20 and 30. This clamping force must be sufficient to handle any loading in the axis of the pipe or conduit run without allowing any shifting of the clamp 10 relative to the pipe or conduit run. The extensions 26, 28, 36, and 38 bear on a horizontal surface, such as a floor, to provide support for the vertical pipe or conduit run. This contrasts with a clamp for a horizontal pipe, which is configured to support the weight of the pipe in a direction perpendicular to the axis of the pipe. Pipe clamps for such runs do not generally exert clamping forces on the pipe, and are thus incapable of supporting loads in the direction of the axis of the horizontal pipe.

Another advantage of the clamp 10 is that it can be shipped in an efficient space-saving configuration. The bar portions 12 and 14 may be "nested" in one another, with the circular section 30 resting within the circular section 20. As described above, the bolts 52 and 54 may be preinstalled in the holes 42 and 44. The bar portions 12 and 14 may be coupled together in the nested storage configuration by flipping the bar portion 14 from the configuration shown in FIG. 3, and engaging the bolts 52 and 54 in the open holes 46 and 48. The nuts 62 and 64 may be tightened, such as by hand, to maintain the bar portions 12 and 14 nested together in this compact configuration. Such a nested configuration makes for easy storage, shipping, and handling of the clamp 10 prior to installation. The bar portions 12 and 14 are easy to separate from one another for installation, due to the presence of the open holes 46 and 48. The nuts 62 and 64 need only be slightly loosened, and then the bar portions may be disengaged from one another. The bolts 52 and 54 may be maintained preinstalled in the holes 42 and 44 during this disengagement or de-nesting process.

FIGS. 6-8 illustrate a variant of the clamp 10, in which a second bar portion 114 has protruding tips 116/118 and 120/122 at ends of its open slots 126 and 128. The protruding tips 116/118 and 120/122 protrude perpendicular to the extensions 136 and 138, in the same direction as the bulge of a central circular section 140. This is toward the side of the second bar portion 114 that contact the nuts 62 and 64. The protruding tips 116/118 and 120/122 may be downward bent corners at the ends of the slots 126 and 128. Alternatively, the protruding tips 116/118 and 120/122 may include added material, such as welded or soldered material. The protruding tips 116/118 and 120/122 aid in keeping the bar portions 12 and 114 coupled together, by keeping the nuts 62 and 64 from passing by the tips unless the nuts are loosened.

The slots 66/68 and 126/128 described above are straight slots, substantially perpendicular to top edges 72 and 74. As such, the slots 66/68 and 126/128 are oriented vertically when the clamp 10 is installed on a vertical pipe run or conduit.

FIGS. 9-11 show alternative slot configurations. FIG. 9 shows a second bar portion 164 with L-shape slots 166 and 168. The slots 166 and 168 have respective vertical sections 172 and 174, and respective horizontal sections 176 and 178. The vertical sections 172 and 174 have open ends along top edges 182 and 184 of extensions 186 and 188. The horizontal sections 176 and 178 couple the vertical sections 172 and 174 to open holes 196 and 198. In coupling the second bar portion 164 to the first bar portion 12 (FIG. 2), first the vertical sections 172 and 174 are engaged onto the bolt shafts 56 and 58 (FIG. 2). Then the second bar portion 114 is shifted over so that the bolt shafts 56 and 58 pass through the horizontal sections 176 and 178, and into the open holes 196 and 198. The use of the L-shape slots 166 and 168 may aid in retaining the bolts 52 and 54 (FIG. 2) within the open holes 196 and 198.

FIG. 10 shows a second bar portion 214 having an L-shape slot 216 and a vertical straight slot 218, in communication with respective open holes 226 and 228. The second bar portion 214 may be engaged to a first bar portion by first engaging one of the bolts with the L-shape slot 216, and then engaging the other of the bolts with the straight slot 218. The L-shape slot 216 may provide advantages in keeping the second bar portion 214 coupled to a first body portion, while avoiding the need to engage two L-shape slots simultaneously.

FIG. 11 shows a second bar portion 264 having a vertical straight slot 266 and a diagonal slot 268, in communication with respective open holes 276 and 278. The diagonal slot 268 is oriented at approximately a 45-degree angle to the vertical, midway between vertical and horizontal directions, although it will be appreciated that the diagonal slot 268 more broadly may be an angled slot oriented in a different direction. The diagonal slot 268 may be engaged with one of the bolts first, with the second bar portion 264 tilted to allow the bolt shaft to pass through the diagonal slot 268 and into the open hole 278. The second bar portion 264 may then be tilted back, and moved to engage the second bolt with the vertical straight slot 266 and the open hole 276.

It will be appreciated that the many other slot configurations are possible. For example, another possible configuration would be a pair of diagonal slots oriented in the same direction.

Further variations are also possible. It will be appreciated that it may be possible to make the bar portions substantially identical to one another, with each of the bar portions having one closed hole and one open hole, perhaps with bolts attached to the closed holes.

FIG. 12 shows an alternative clamp 310 in which the bar portions 312 and 314 have respective pairs of closed holes 316/318 and 322/324. Bolts 332 and 334 are attached to the first bar portion 312, using any of the variety of suitable attaching mechanisms described above. The clamp 310 still requires nuts 342 and 344 to be threaded onto the bolts 332 and 334 during installation, rather than having nuts pre-threaded onto bolts. However, the clamp 310 does require fewer parts and/or fewer installation tools than conventional presently-used riser clamps.

FIGS. 13 and 14 show another alternate embodiment clamp 410 that is similar in many ways to the clamp 10 (FIG. 2). Like the clamp 10, the clamp 410 has a pair of bar portions 412 and 414. The bar portion 412 has a pair of straight extensions 426 and 428 that extend outward from opposite sides of a circular section 420, and the bar portion 414 has a pair of straight extensions 436 and 438 that extend outward from opposite sides of a circular section 430. The clamp 410 differs from the clamp 10 in that the extensions 426, 428, 436, and 438 are shorter than the extensions 26, 28, 36, and 38 (FIG. 2) of the clamp 10. In other respects the clamp 410 is similar to the clamp 10 or alternate embodiments described above.

Figure 15:
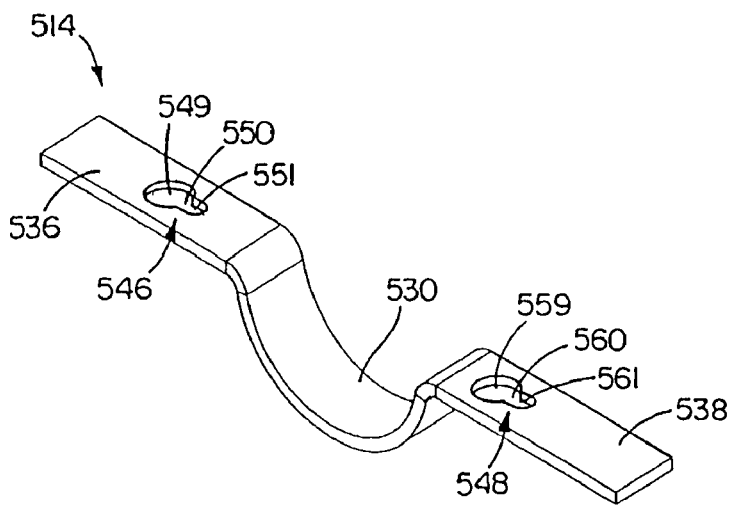
FIG. 15 is an oblique view of still another alternate embodiment second bar portion usable as part of a clamp of the present invention, having keyhole-shape closed slots arrayed in a horizontal orientation (along the length of extensions of the second bar portion)
Figure 16:
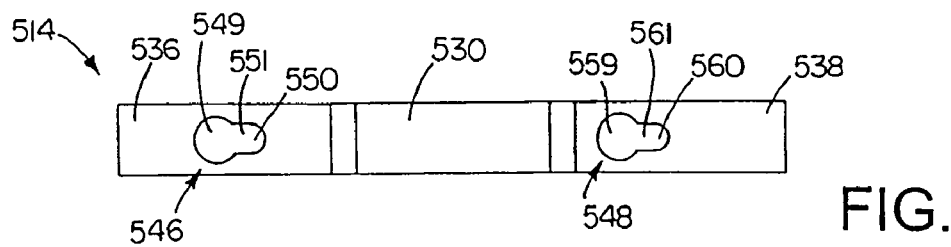
FIG. 16 is a side view of the second bar portion of FIG. 15.

FIGS. 15 and 16 show an alternative embodiment second bar portion 514, usable with the first bar portion 12 (FIG. 2), or a variation thereof. The bar portion 514 has extensions 536 and 538 that extend outward from opposite sides of a circular section 530. The extensions 536 and 538 have respective closed keyhole-shape slots 546 and 548. The slot 546 has a larger-diameter portion 549 and a smaller-diameter portion 550, connected to each other by a slot channel 551. The larger-diameter portion 549 is large enough to allow passage of a nut, such as the nuts 62 and 64 (FIG. 2). The slot channel 551 and the smaller-diameter portion 550 are wide enough to allow a bolt shaft, such as the bolt shafts 56 and 58 (FIG. 2), to enter them. However, the slot channel 551 and the smaller-diameter portion 550 are too narrow to allow a nut threaded on the bolt shaft to pass through.

The slot 548 has similar parts: a larger-diameter portion 559, a smaller-diameter portion 560, and a slot channel 561. The slots 546 and 548 are oriented in the same way, so that the location of the larger-diameter portion 549 relative to the smaller-diameter portion 550 is the same as the location of the larger-diameter portion 559 relative to the smaller-diameter portion 560. As illustrated in FIGS. 15 and 16, the larger-diameter portions 549 and 559 are to the left of the respective smaller-diameter portions 551 and 561 of the slots. The larger-diameter portion 549 is relatively distal, that is farther than the smaller-diameter portion 551 from the central circular section 530. In contrast, the larger-diameter portion 559 is relatively proximal, that is closer than the smaller-diameter portion 561 to the central circular section 530. The smaller-diameter portions 551 and 561 may be located along their respective extensions 536 and 538 at substantially the same distance from the central circular section 530.

The bar portion 514 may be utilized with a first bar portion having nuts pre-installed on bolts, whether or not the bolts are fixedly attached to the first bar portion. The first bar portion, such as the first bar portion 12 (FIG. 2), is placed against an object to be clamped, such as a circular object. Then the bar portion 514 is brought into engagement with the first bar portion. The pre-installed nuts are passed through the larger-diameter ends 549 and 559 of the slots 546 and 548. The bar portions are then translated relative to one another so that the bolt shafts are now in the smaller-diameter ends 551 and 561 of the slots 546 and 548, with the second bar portion 514 between the nuts and the first bar portion. This relative translation is in a direction along the lengths of the extensions 536 and 538, and may accomplished by moving either bar portion, or both bar portions. After the translation, the nuts are then tightened to securely clamp the circular object between the first and second bar portions. The installation process advantageously only requires two separate parts to be handled in the vicinity of the object to be clamped.

Figure 17:
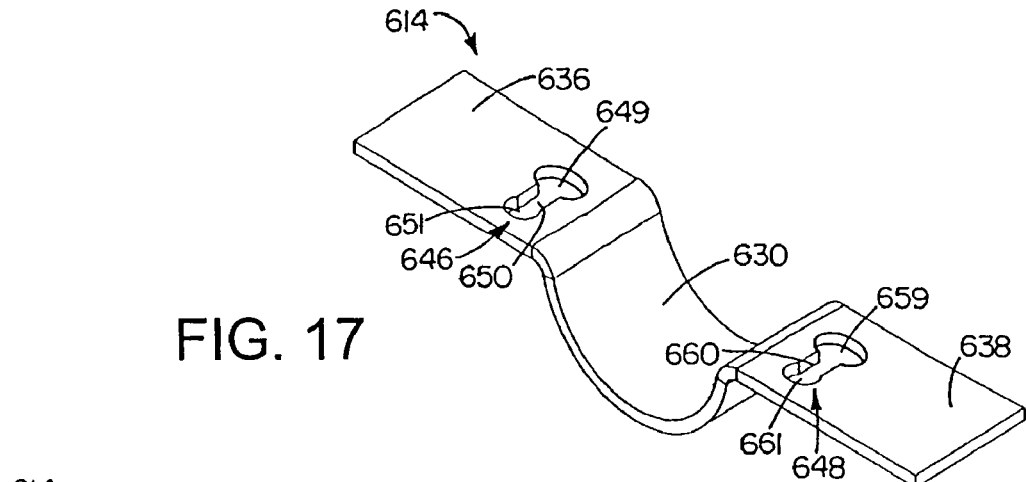
FIG. 17 is an oblique view of still another alternate embodiment second bar portion usable as part of a clamp of the present invention, having keyhole-shape closed slots arrayed in a vertical orientation (along the width of extensions of the second bar portion)
Figure 18:
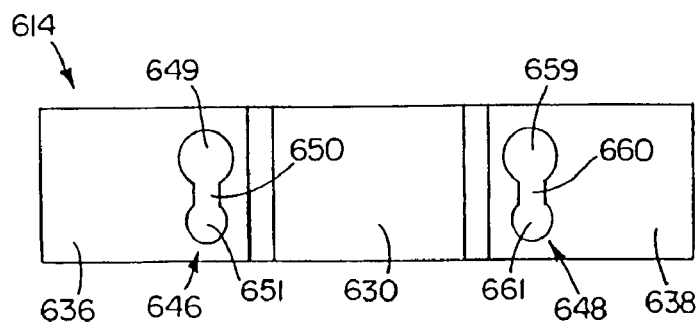
FIG. 18 is a side view of the second bar portion of FIG. 17.

FIGS. 17 and 18 show a variant on the keyhole slot concept described above. A second bar portion 614 includes a pair of keyhole-shape closed slots 646 and 648 in extensions 636 and 638 that are at opposite ends of a central circular section 630. The slots 646 and 648 have a similar shape to the closed keyhole-shape slots 546 and 548 (FIG. 15) of the bar portion 514 (FIG. 15). But whereas the slots 546 and 548 are oriented horizontally, with the larger-diameter portions 549 and 559 alongside the smaller-diameter portions 551 and 561 along the lengths of the extensions 536 and 538 (FIG. 15), the slots 646 and 648 are oriented vertically. That is, larger-diameter portions 649 and 659 are alongside smaller-diameter portions 651 and 661 along widths of the extensions 636 and 638. This makes the bar portion 614 wider than the bar portion 514. However, the change in orientation of the slots may make for easier installation of the clamp, since relative translation of the bar portions in a vertical direction (in the direction of the axis of the circular object, and along the widths of the extensions 636 and 638) may be easier than relative translation in a horizontal direction (perpendicular to the axis of the object being clamped. A clamp that requires horizontal relative translation may require a greater initial clearance between the bar portions and the object to be clamped, in order to avoid interference from the object when coupling the bar portions.

Figure 19:
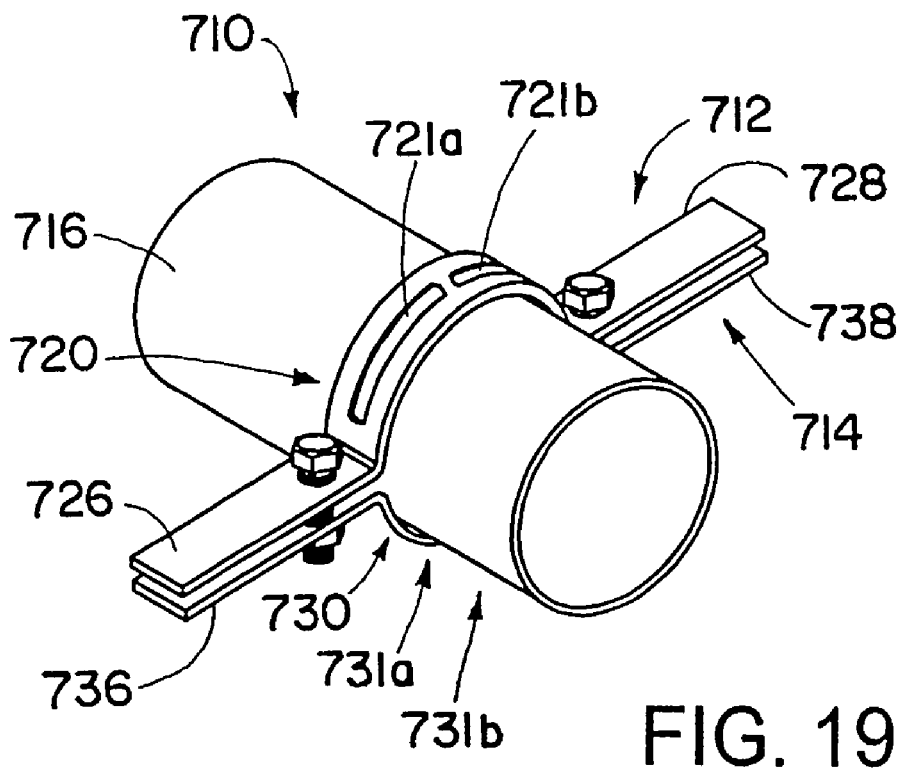
FIG. 19 is an oblique view of a further embodiment clamp in accordance with the invention.
Figure 20:
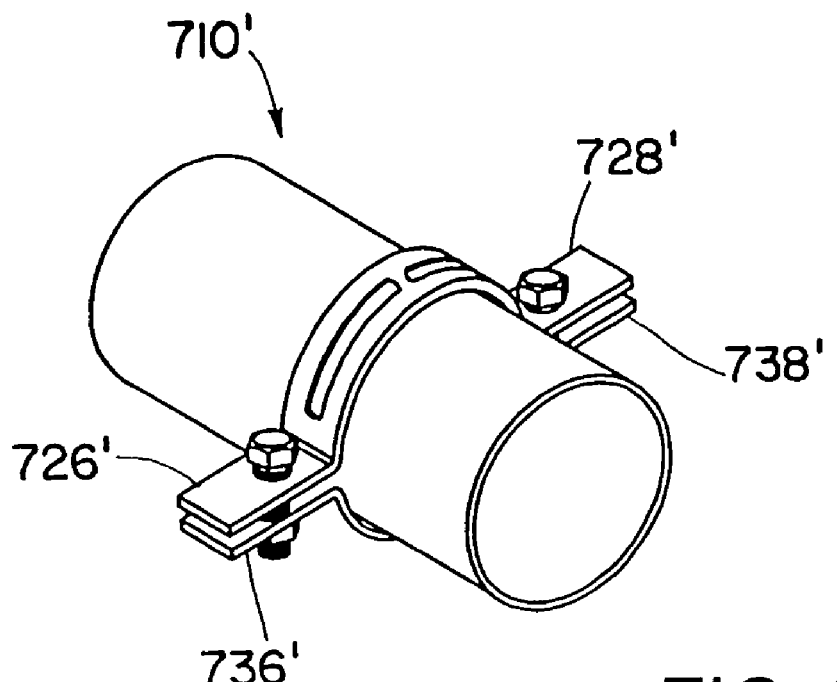
FIG. 20 is an oblique view of a variant of the clamp of FIG. 19.
Figure 21:
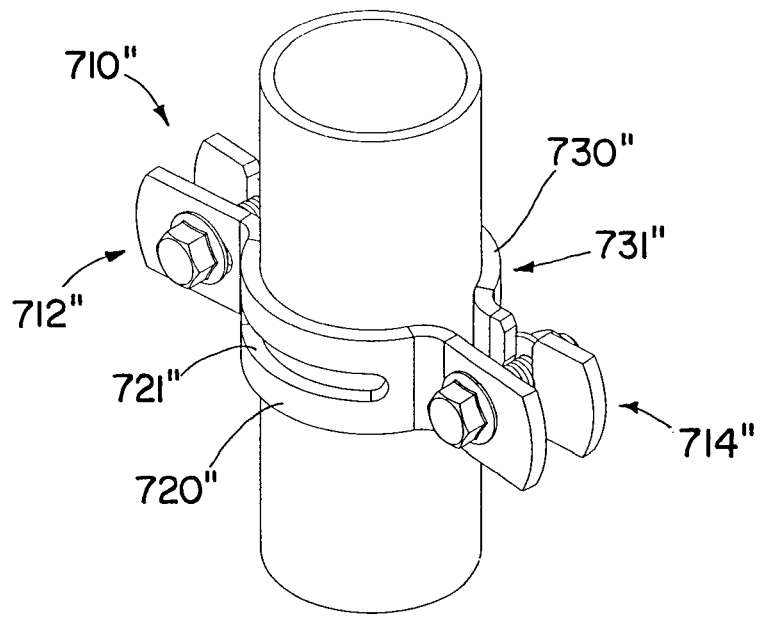
FIG. 21 is an oblique view of another variant of the clamp of the FIG. 20.

FIGS. 19-21 show further clamp variants 710, 710', and 710". The clamp 710 (FIG. 19) is has respective pairs of longitudinal slots 721a/721b and 731a/731b in circular object-receiving sections 720 and 730 of its bar portions 712 and 714. In other aspects the clamp 710 may be similar to the various clamp embodiments described herein, for instance with the bar portions 712 and 714 having respective pairs of straight extensions 726/728 and 736/738 extending away from the central sections 720 and 730. For each of the bar portions 712 and 714, the longitudinal slots 721a/721b and 731a/731b extend across the central sections 720 and 730 in direction from one of the straight extensions 726/736 to the other straight extension 728/738. The pairs of slots 721a/721b and 731a/731b are arranged end to end, so that together they cover most of the distance between the pairs of straight extensions 726/728 and 736/738 of the bar portions 712 and 714. The longitudinal slots 721a/721b and 731a/731b allow the circular central sections 720 and 730 to deform more easily, so as to conform better to a circular object 716 held by the clamp 710. This improvement of the wrapping of the circular sections 720 and 730 on the object 716 provides a better holding or gripping force on the object 716, better securing the object 716. The slotted bar portions 712 and 714 also require less material than bar portions without slots, which reduces weight and material costs.

The clamp 710' (FIG. 20) is similar to the clamp 710, but with shorter straight extensions (short ears) 726'/728' and 736'/738', comparable to the clamp 410 shown in FIGS. 13 and 14. The clamp 710" (FIG. 21) has bar portions 712" and 714" with respective curved central sections 720" and 730". The curved central sections 720" and 730" have respective single slots 721" and 731". The single-slot clamps may be used for smaller diameter objects, with multiple-slot clamps used for larger diameter objects.

It will be appreciated that the concept of a clamp with a slotted circular central portion may be combined with many of the features of the various embodiments described herein, such as the various configurations of open holes described herein. It will also be appreciated that many variations are possible in the number and configuration of the slots in circular central portions. For instance the central portion slots may have non-uniform width, and/or may be placed in a side-by-side configuration, to give only two examples.

Figure 1:
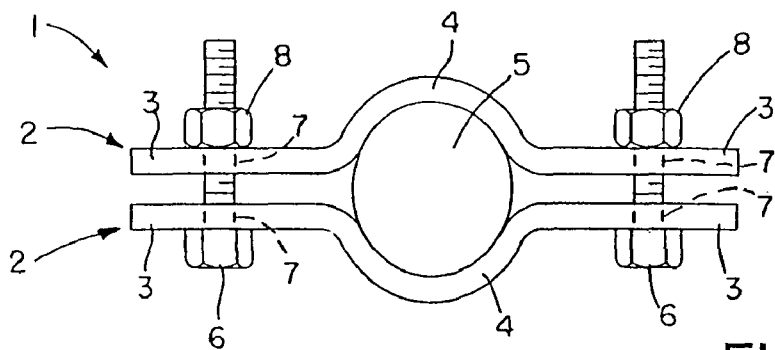
FIG. 1 is a plan view of a prior art riser clamp secured to a pipe run.
Figure 22:
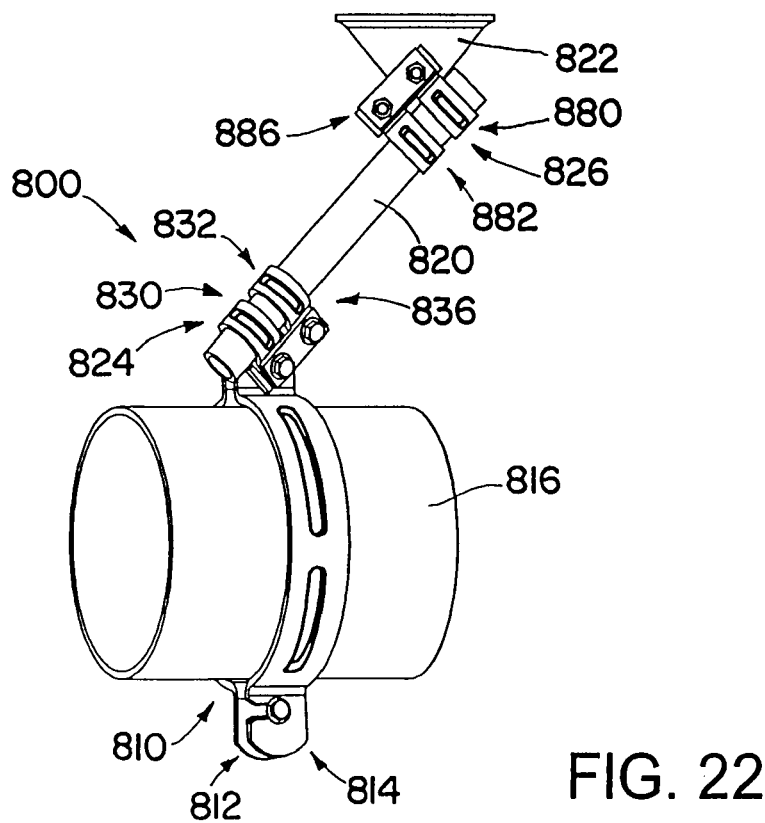
FIG. 22 is an oblique view of a seismic sway brace in accordance with an embodiment of the invention.
Figure 23:
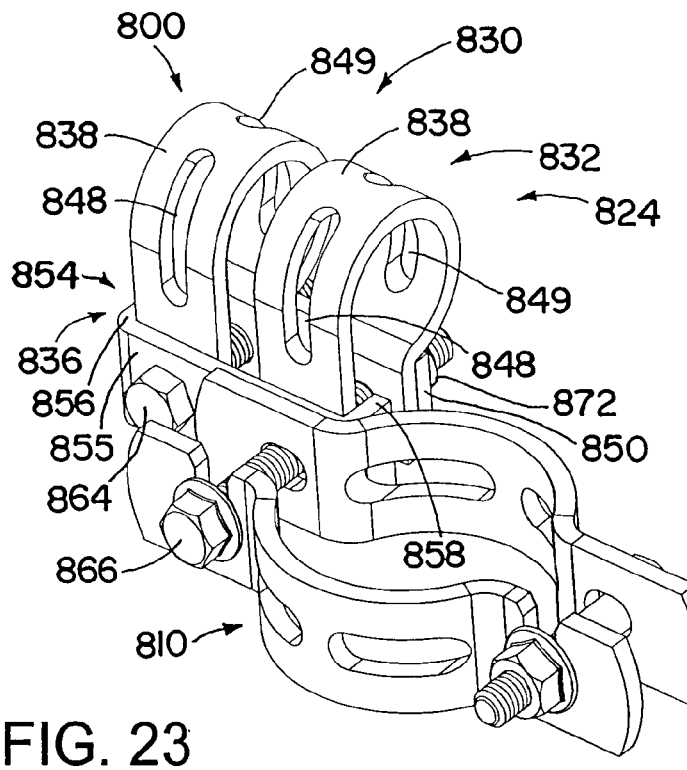
FIG. 23 is an oblique view of a connecting member of a strap clamp of the seismic sway brace of FIG. 22.
Figure 24:
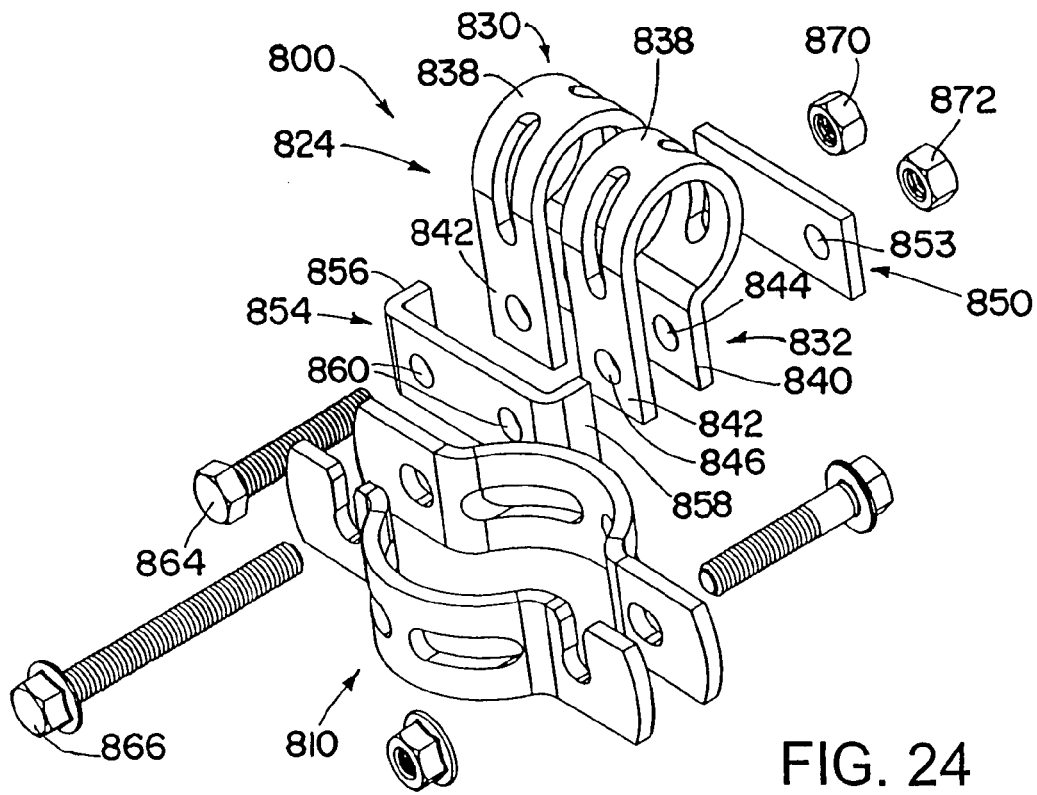
FIG. 24 is an exploded view of the connecting member of FIG. 23.

FIGS. 22-24 show a seismic sway brace 800 used for bracing a circular object 816, such as a pipe or a conduit. A clamp 810 is secured to the object 816. The clamp 810 may be clamp such as those described herein, including a pair of bar portions 812 and 814 incorporating the various features for easily securing a clamp to a circular object with a reduced number of parts and/or in reduced steps, as well as having the other advantages of clamps described herein. Alternatively, the clamp 810 may be a prior art clamp having separate bolts passing through pairs of closed holes, such as the prior art clamp 1 shown in FIG. 1.

The clamp 810 is connected to a sway brace pipe 820 that in turn is connected to a bracket 822 mounted to building structure. A pair of connecting mechanisms 824 and 826 connect the sway brace pipe 820 to the clamp 810 and the bracket 822, respectively.

The connecting mechanism 824 includes a pair of strap clamps 830 and 832, and a retainer 836 for linking the strap clamps 830 and 832 together. The strap clamps 830 and 832 each have a pair of end tabs 840 and 842 between a curved portion 838 that makes a substantially full circle about a central opening 839. The tabs 840 and 842 overlie one another, and have respective holes 844 and 846 in them. When the tabs 840 and 842 are pressed together, the central curved portion 838 is tightened, reducing the size of its opening and pressing the curved portion 838 against any object inside it. The curved portion 838 has a pair of longitudinal slots 848 and 849. The longitudinal slots 848 and 849 are along the center of the width of the curved portion 838. The longitudinal slots 848 and 849 provide similar benefits to the longitudinal slots 721a/721b and 731a/731b in the clamp 710 (FIG. 19).

The retainer 836 includes a pair of bars 850 and 854. The first bar 850 is a flat bar with holes 853 in it. The second bar 854 has a flat center portion 855 with upturned ends 856 and 858. The upturned ends 856 and 858 hold the strap clamps 830 and 832 together. Holes 860 in the center portion 855 are located to correspond to the location to the holes 844 and 846 of each of the strap clamps 830 and 832, when the strap clamps 830 and 832 are between the upturned ends 856 and 858. The holes 853 in the first bar 850 also correspond to the location of the holes 844 and 846 in the strap clamp tabs 840 and 842. The strap clamp tabs 840 and 842 are pressed between the bars 850 and 854 and of the retainer 836.

Bolts 864 and 866 pass through the holes 844 and 846 of the strap clamps 830 and 832, and the holes 860 and 862 of the retainer 836. One of the bolts 864 also passed through closed or open holes on one side of the clamp 810. The bolts 864 and 866 may be separate pieces. Alternatively, the bolt 864 may be part of the clamp 810, being fixed to one of the bar portions 812 and 814 of the clamp 810. Nuts 870 and 872 are threaded onto the bolts 864 and 866 and tightened to secure the connecting mechanism 824. Tightening the nuts 870 and 872 causes the curved portions 838 of the strap clamps 830 and 832 to grip and hold the sway brace pipe bar 820 within the openings 839 in the strap clamps 830 and 832. Tightening the nuts 870 and 872 also secures the retainer 836 against the clamp 810.

The connecting mechanism 826 may have all of the same parts as the connecting mechanism 824. The connecting mechanism 826 secures strap clamps 880 and 882 to the sway brace pipe 820 by gripping, and holds the strap clamps 880 and 882 to the bracket 822 by tightening bolts and nuts to tighten a retainer 886.

It will be appreciated that many variations are possible for the seismic sway brace 800 described above. Any or all of the clamps 810, 830, 832, 880, and 882 may have a patterned gripping surface, such as a knurled or serrated surface, to aid in gripping. The clamp 810 may be replaced by any of a variety of clamps for circular objects, with or without open slots for receiving the shafts of bolts. The sway brace pipe 820 may be replaced by a bar or other circular object. With suitable modifications, other types rigid sway bracing members, such as strut, channel, angle iron, or the like. As another alternative, it will be appreciated that a single strap clamp may be used in place of either or both of the multipart connecting mechanisms 824 and 826. Other types of connecting mechanism may also be used, such as mechanisms that clamp to a rigid wall of a bracing member, such as the inner and outer surfaces of a pipe wall. Also, alternative connecting mechanisms may involve threaded connections to a threaded brace member, such as a threaded pipe. Many other types of attachments to sway brace members are known and can be utilized as part of the seismic sway brace 800.

The seismic sway brace 800 speeds the installation of pipe, conduit, clamps, sway bracing and other structural and non-structural components. Fewer loose parts also provides an advantage in reducing delays for dropped parts. The slotted pipe or conduit clamp and/or strap clamps improves the gripping strength and force to pipe, conduit, or other structural and non-structural components or equipment, relative to clamps without slots.

A method of seismic sway bracing of a circular object, such as a pipe or conduit, involves placing a clamp, such as the clamps described herein, around the circular object, and using strap clamps to secure the clamp around the circular object to a sway bracing member, such as a pipe or rod. The circular object clamp and/or the strap clamps may have single slots or multiple slots in them, to facilitate securing of the clamps to the circular object and/or the sway bracing member.

A method of seismic sway bracing of a non-circular object, such as a strut trapeze of rigid conduits, involves placing a clamp, such as the clamps described herein or other clamping method, around a non-circular object, and using strap clamps to secure the clamp around the non-circular object to a sway bracing member, such as a pipe, rod or other. The non-circular object clamp and/or the strap clamps may have single slots or multiple slots in them, to facilitate securing of the clamps to the non-circular object and/or the sway bracing member.

Figure 25:
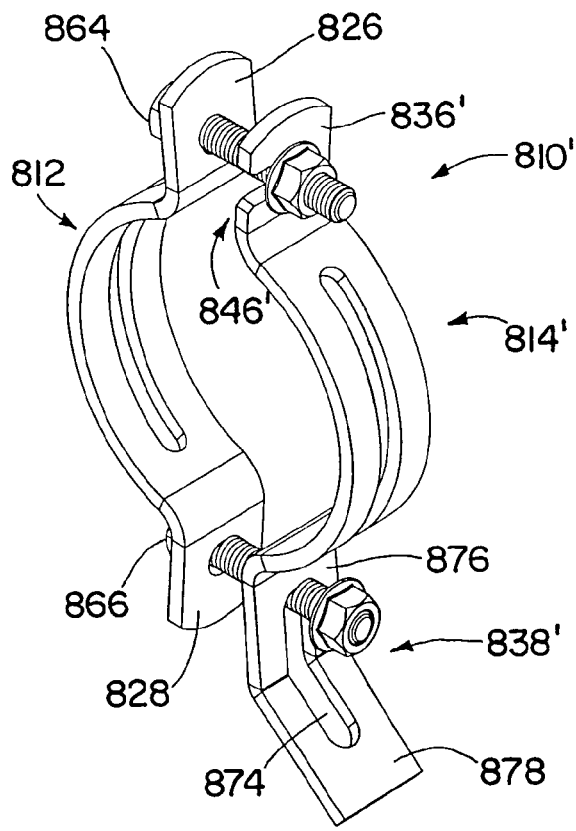
FIG. 25 is an oblique view of another variant clamp in accordance with an embodiment of the present invention.
Figure 26:
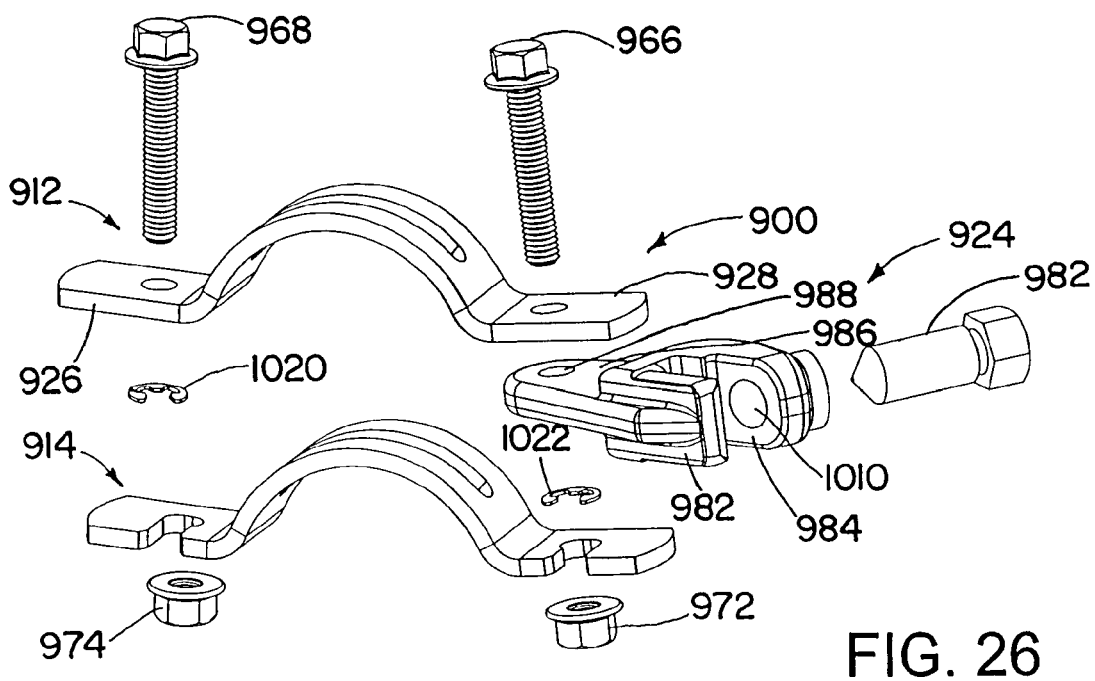
FIG. 26 is an exploded view of a part of a seismic sway brace in accordance with another embodiment of the present invention.
Figure 27:
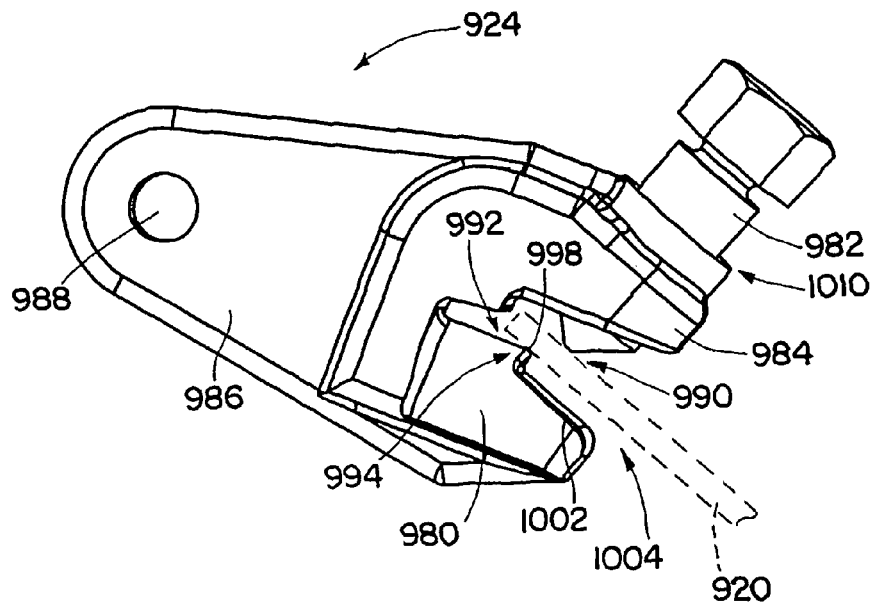
FIG. 27 is an oblique view of a pipe clamp that is part of the seismic sway brace of FIG. 26.

FIG. 25 shows an alternative embodiment clamp 810' that may be used in place of the clamp 810 in the seismic sway brace 800. The clamp 810' may use the same first bar portion 812 as the clamp 810. A second bar portion 814' of the clamp 810' has a pair of extensions 836' and 838'. The extension 836' has an open hole 846' that may be similar in configuration to the various open holes described herein. The open hole 846' may be used to receive a bolt 864 that may be preinstalled in an extension 826 in the first bar portion 812.

The other extension 838' has a slot 874 that extends over both a proximal portion 876 opposite an extension 828 of the first bar portion 812, and a distal portion 878. The distal portion 878 is angled away from both the proximal portion 876 and the extension 828. A bolt 866 runs both through a closed hole 846' in the extension 828, and through the slot 874.

The clamp 810' may be opened for placing around a circular object, such as a sprinkler pipe or other pipe or conduit, by hingedly tilting the second bar portion 814' relative to the first bar portion 812. The hinging may be accomplished by sliding the second bar portion 814' relative to the second bar portion 812, such that the bolt 866 moves into the portion of the slot 874 that is in the distal portion 878 of the extension 828. This allows the second bar portion 814' to pivot relative to the first bar portion 812. This opens up a space between the extensions 826 and 836', allowing the clamp 810' to be placed around an object such as the circular object 816 (FIG. 22).

After the bar portions 812 and 814' are placed around an object the hinging operation is reversed to close the clamp 810'—the bar portion 814' pivots and moves relative to the bar portion 812. The moves the shaft of the bolt 866 into the portion of the slot 874 that is in the proximal portion 876. This closes the space between the extensions 826 and 836'. A bolt 868 may then be engaged in the open hole 846' to couple the bar portions 812 and 814' together on both sides of the object.

FIGS. 26-29 show another embodiment, part of a seismic clamp 900. The clamp 900 includes bar portions 912 and 914, which are held together by bolts 966 and 968 and nuts 972 and 974. The bar portions 912 and 914 may be substantially the same as the bar portions 812 and 814 (FIG. 22) described above, and therefore further details regarding the bar portions 912 and 914 and their coupling are omitted in the description below. The bar portions 912 and 914 surround and engage (are clamped to) a circular object 916, such as a pipe or a conduit, for example a horizontal run of a sprinkler system. The bar portions 912 and 914 have respective curved central sections 922 and 932. The curved central sections 922 and 932 have respective single slots 923 and 933.

A sway brace pipe clamp 924 is used to engage a sway brace pipe 920. The sway brace pipe 920 may be similar to the pipe 820 (FIG. 22). The pipe clamp 924 is used to couple to one end of the pipe 920 by gripping the pipe wall of the pipe 920. A clamp similar to the clamp 924 may be used to couple the opposite end of the pipe 920 to structure, such as a ceiling or wall, for example by mechanically coupling the opposite end of the pipe 920 to a suitable bracket. Such a bracket may include a member that passes through a hole in the clamp body.

The clamp 924 is a cast clamp, and clamps the pipe 920 between a lower member 980 and a clamping screw 982. The lower member 980 and an upper member 984 protrude from a clamp body 986. The clamp body 986 has a hole 988 to allow a shaft of the bolt 966 to pass therethrough.

The pipe 920 is received in a pipe-receiving space 990 between the members 980 and 984. The lower member 980 has an upper surface 992 having a step 994 with a corner 998. A slanted surface 1002 slopes away from the step 994, toward an opening 1004 at the mouth of the pipe-receiving space 990. The upper member 984 has an internally-threaded hole 1010 for receiving the clamping screw 982. The hole 1010 is angled relative to the clamp body 986, for example with its axis substantially perpendicular to the slanted surface 1002. Thus the clamping screw 982 may move substantially perpendicularly toward the slanted surface 1002 when the clamping screw 982 is tightened.

The pipe clamp 924 engages the pipe 920 by first inserting the lower member 980 into the pipe 920. With the end of the pipe wall thus in the pipe-receiving space 990, the clamping screw 982 is tightened against an outer surface of the pipe 920. This clamps the inside surface of the pipe wall against the lower member 980. The pipe wall is clamped by being engaged on both its outer and inner surfaces. The tip of the clamping screw 982 presses against the outer surface, and the corner 998 presses against the inner surface.

Figure 28:
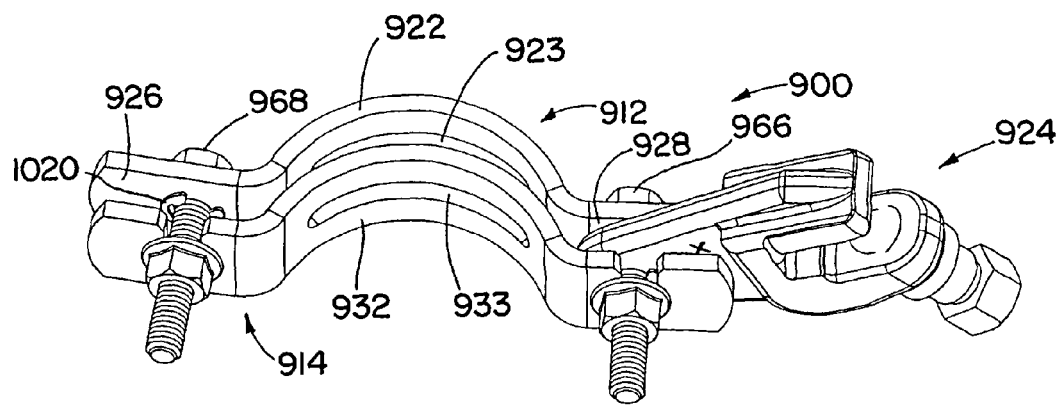
FIG. 28 is an oblique view of the part of the seismic sway brace of FIG. 26, in a nested configuration.
Figure 29:
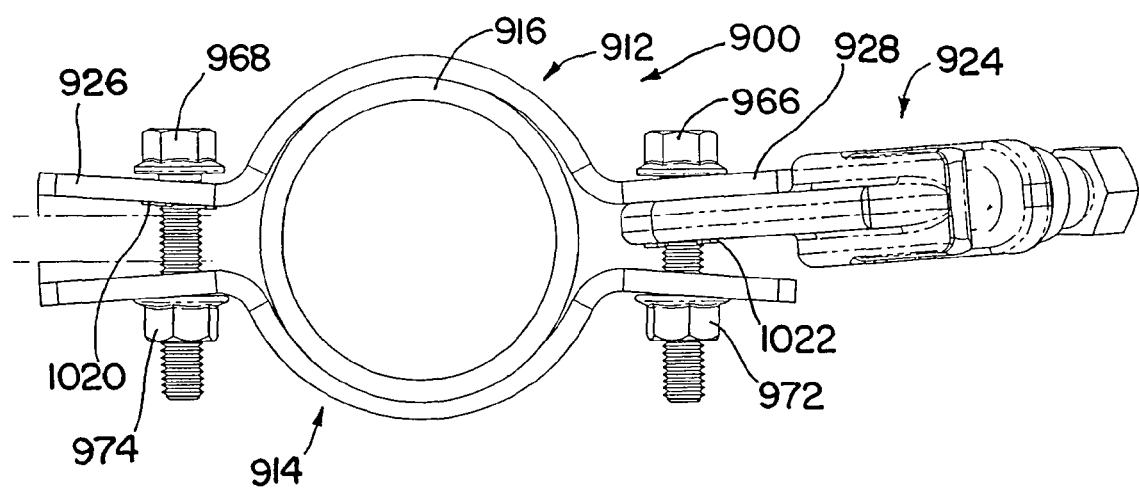
FIG. 29 is an end view of the part of the seismic sway brace of FIG. 26, installed on a circular object such as a pipe or conduit.

The seismic clamp 900 also includes a pair of plastic retainers 1020 and 1022. The retainers 1020 and 1022 are located around shafts of the bolts 966 and 968. The retainers 1020 and 1022 have tabs along their inner surfaces that engage threads on the shafts of the bolts 966 and 968. The retainers 1020 and 1022 aid in maintaining extensions 926 and 928 against bolt heads of the bolts 966 968, as well as retaining the pipe clamp 924 against the extension 928. The retainers 1020 and 1022 advantageously keep the parts in place during assembly of the seismic clamp 900 into its nested configuration (FIG. 28). The retainers 1020 and 1022 also keep the parts in place when the clamp 900 is in its installed configuration around the circular object 916.

In the nested configuration the second bar portion 914 is flipped so that the central circular section of the bar portion 914 is nested in the central circular section of the first bar portion 912. This produces the space-saving configuration for shipment and handling that is discussed above with regard to another embodiment, while still allowing easy separation of the bar portions 912 and 914 for installation. The bar portions 912 and 914 may be separated from one another without a need to disengage the bolts 966 and 968 from the first bar portion 912. The retainers 1020 and 1022 keep the first bar portion 912 and the pipe clamp 924 in place during the disengagement of the second bar portion 914 from the nested configuration.

The seismic clamps 800 and 900, and their variants disclosed herein, may be used to secure horizontal pipe runs against excessive movement from seismic forces. It is particularly desirable for the clamps 800 and 900 to securely grip such pipe runs. This is in contrast with standard clamps for a horizontal pipe, which may be configured primarily to support the weight of the pipe in a direction perpendicular to the axis of the pipe. Pipe clamps for such runs do not generally exert clamping forces on the pipe, and are thus incapable of supporting loads in the direction of the axis of the horizontal pipe, an advantageous characteristic for seismic clamps.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of seismic bracing, the method comprising:
placing a clamp around a circular object to be braced; and
using one or more additional clamps to secure the clamp around the circular object to a sway bracing member;
wherein the clamp for the circular object includes:
a first bar portion having a first curved central section, and a pair of first extensions extending from opposite ends of the first curved central section;
a second bar portion having a second curved central section, and a pair of second extensions extending from opposite ends of the second curved central section; and
a pair of fasteners joining the bar portions together;
wherein the first bar portion has a pair of holes in respective of the first extensions;
wherein the second bar portion has a pair of holes in respective of the second extensions; and
wherein at least one of the holes in the second extensions is an open hole;
wherein the placing includes:
placing respective curved central sections of first and second bar portions on opposite sides of the circular object; and
coupling the bar portions together, with the object to be clamped between the curved central sections, wherein the coupling includes passing a shaft of a fastener that is coupled to one of the extensions of the first bar portion, through a slot and into an open hole in one of the extensions in the second bar portion.

2. The method of claim 1, wherein the placing includes:
opening a space between respective first extensions of the bar portions, while second extensions of the bar portions are hingedly coupled together with a bolt;
after the opening, moving the bar portions around the circular object; and
after the moving, closing the space and mechanically coupling the first extensions of the bar portions together.

3. The method of claim 1, further providing at least one of the fasteners precoupled to the first bar portion, before the placing.

4. The method of claim 3,
wherein the at least one fastener is a bolt; and
wherein the coupling further includes tightening a nut threadedly engaged on a threaded bolt shaft of the bolt.

5. The method of claim 1, wherein the using the one or more additional clamps includes using one or more strap clamps as the additional clamps.

6. The method of claim 1,
wherein at least one of the curved central sections has at least one longitudinal slot therein; and wherein the placing includes placing the curved central section with the longitudinal slot therein against the circular object.

7. The method of claim 1, wherein the one or more additional clamps includes a pair of strap clamps, and a retainer for holding the strap clamps together.

8. The method of claim 1,
wherein the one or more additional clamps is a cast clamp; and
further comprising engaging the sway bracing member by clamping the sway bracing member between a clamping screw and a lower member.

9. The method of claim 1,
wherein the sway bracing member includes a pipe; and
wherein the using includes using the one or more additional clamps to secure the clamp around the circular object to the pipe.

10. A seismic sway brace comprising:
a circular object clamp;
a sway brace member; and
one or more additional clamps for coupling the sway brace member to the circular object clamp, and for coupling the sway brace member to building structure;
wherein the circular object clamp includes:
    a first bar portion having a first curved central section, and a pair of first extensions extending from opposite ends of the first curved central section;
    a second bar portion having a second curved central section, and a pair of second extensions extending from opposite ends of the second curved central section; and
    a pair of fasteners joining the bar portions together
wherein the first curved central section has a longitudinal slot therein extending from in a direction from one of the opposite ends of the first curved central section to the other of the opposite ends of the first curved central section.

11. The brace of claim 10, wherein the second curved central section has a longitudinal slot therein extending from in a direction from one of the opposite ends of the second curved central section to the other of the opposite ends of the second curved central section.

12. The brace of claim 10, wherein the one or more additional clamps includes a pair of strap clamps, and a retainer for holding the strap clamps together.

13. The brace of claim 10, wherein the one or more additional clamps is a cast clamp that engages the sway bracing member by clamping the sway bracing member between a clamping screw and a lower member.

14. A seismic sway brace comprising:
a circular object clamp;
a sway brace member; and
one or more additional clamps for coupling the sway brace member to the circular object clamp, and for coupling the sway brace member to building structure;
wherein the circular object clamp includes:
    a first bar portion having a first curved central section, and a pair of first extensions extending from opposite ends of the first curved central section;
    a second bar portion having a second curved central section, and a pair of second extensions extending from opposite ends of the second curved central section; and
    a pair of fasteners joining the bar portions together;
wherein the first bar portion has a pair of holes in respective of the first extensions;
wherein the second bar portion has a pair of holes in respective of the second extensions; and
wherein at least one of the holes in the second extensions is an open hole.

15. The brace of claim 14, wherein both of the holes in the second extensions are open holes.

16. The brace of claim 14, wherein the one or more additional clamps includes a pair of strap clamps, and a retainer for holding the strap clamps together.

17. The brace of claim 14, wherein the one or more additional clamps is a cast clamp that engages the sway bracing member by clamping the sway bracing member between a clamping screw and a lower member.

18. The brace of claim 14, wherein the first curved central section has a longitudinal slot therein extending from in a direction from one of the opposite ends of the first curved central section to the other of the opposite ends of the first curved central section.

19. The brace of claim 18, wherein the second curved central section has a longitudinal slot therein extending from in a direction from one of the opposite ends of the second curved central section to the other of the opposite ends of the second curved central section.

\* \* \* \* \*